(12) United States Patent
Cha

(10) Patent No.: US 6,751,075 B2
(45) Date of Patent: Jun. 15, 2004

(54) SUPERCONDUCTING FAULT CURRENT CONTROLLER/CURRENT CONTROLLER

(75) Inventor: Yung S. Cha, Darien, IL (US)

(73) Assignee: The University of Chicago, Chicago, IL (US)

( * ) Notice: Subject to any disclaimer, the term of this patent is extended or adjusted under 35 U.S.C. 154(b) by 142 days.

(21) Appl. No.: 10/015,373

(22) Filed: Dec. 12, 2001

(65) Prior Publication Data

US 2003/0107862 A1 Jun. 12, 2003

(51) Int. Cl.[7] .............................................. H02H 7/00
(52) U.S. Cl. ......................................... 361/19; 361/141
(58) Field of Search ............................. 361/10, 11, 58, 361/19, 141, 143

(56) References Cited

U.S. PATENT DOCUMENTS

| | | | |
|---|---|---|---|
| 4,846,255 A | | 7/1989 | Hull |
| 4,987,390 A | * | 1/1991 | Mouri et al. ................. 332/173 |
| 5,241,447 A | * | 8/1993 | Barber et al. ................ 361/141 |
| 5,475,560 A | * | 12/1995 | Onishi et al. ............... 361/141 |
| 5,557,344 A | | 9/1996 | Chen |
| 5,694,279 A | * | 12/1997 | Mumford ...................... 361/19 |
| 5,713,237 A | | 2/1998 | Bruns |
| 5,892,644 A | | 4/1999 | Evans et al. |
| 5,930,095 A | * | 7/1999 | Joo et al. ...................... 361/58 |
| 6,014,069 A | * | 1/2000 | Havens et al. ............. 335/216 |

OTHER PUBLICATIONS

M.G. Ennis, T.J. Tobin, Y.S. Cha, and J.R. Hull, Fault Current Limiter–Predominately Resistive Behavior of a BSCCO–Shielded Core Reactor, IEEE Transaction on Applied Supercon–ductivity, vol. 11, No. 1, pp. 2050–2053, Mar., 2001.

* cited by examiner

Primary Examiner—Stephen W. Jackson
Assistant Examiner—Danny Nguyen
(74) Attorney, Agent, or Firm—Emrich and Dithmar

(57) ABSTRACT

A superconducting fault current controller/current controller employs a superconducting-shielded core reactor (SSCR) with a variable impedance in a secondary circuit to control current in a primary circuit such as an electrical distribution system. In a second embodiment, a variable current source is employed in a secondary circuit of an SSCR to control current in the primary circuit. In a third embodiment, both a variable impedance in one secondary circuit and a variable current source in a second circuit of an SSCR are employed for separate and independent control of current in the primary circuit.

23 Claims, 12 Drawing Sheets

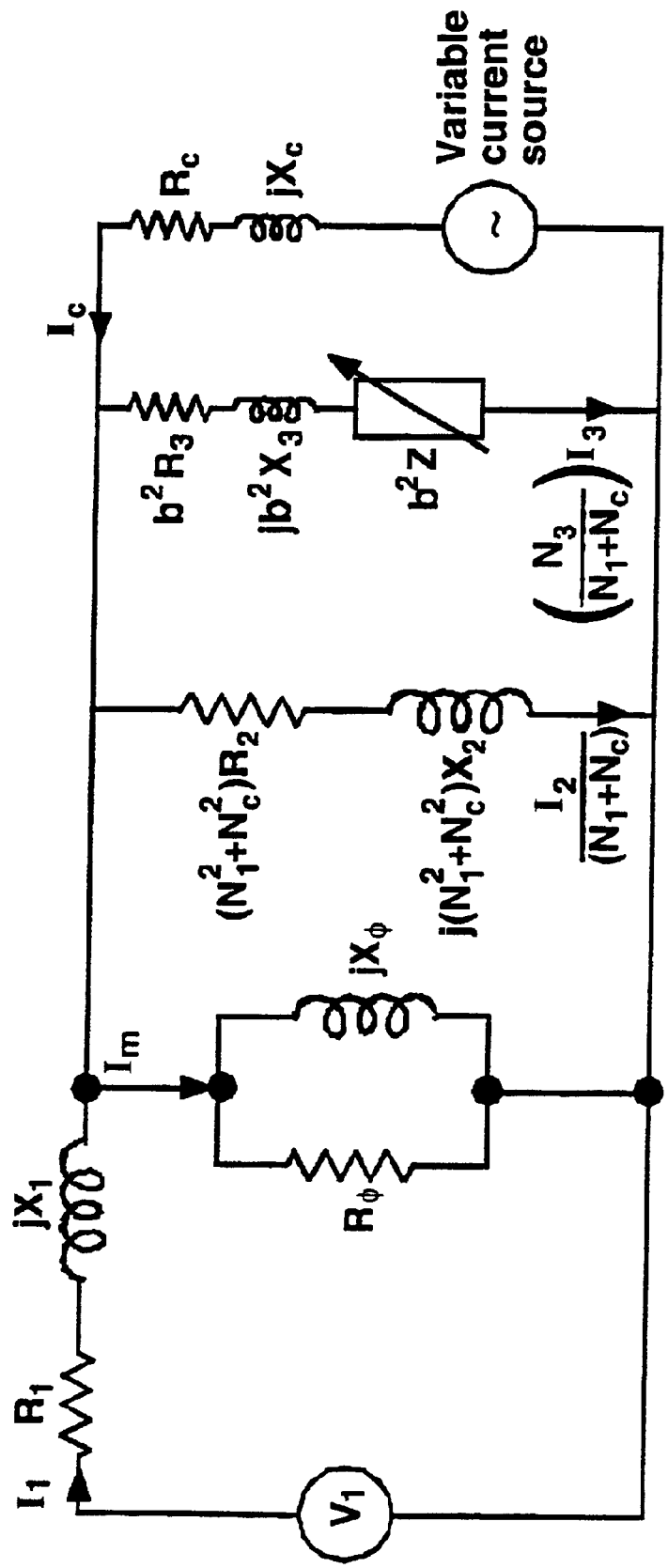
FG 12

SUPERCONDUCTING FAULT CURRENT CONTROLLER/CURRENT CONTROLLER

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

FIELD OF INVENTION

This invention relates generally to Fault Current Controllers (FCCs) and Current Controllers (CCs) which are used in high power applications to limit excessive current in electrical circuits, such as electrical power generators, under sudden fault conditions, such as a lightning strike and other fault occurrences to limit damage to associated electrical distribution equipment. In particular, the present invention relates to Fault Current Controllers and Current Controllers employing a superconducting shield core reactor (SSCR) as a fault detection and control element in the current controller circuit.

BACKGROUND OF THE INVENTION

Superconducting Fault Current Controllers (FCC) and Current Controller (CC) are of significant interest to electric utility companies desirous of reducing or eliminating damage due to excessive current conditions. An FCC is a variable impedance device, which can provide impedance at different levels in an electrical circuit which is operable under fault conditions. A CC is a variable impedance device in an electrical circuit under continuous (normal) operating conditions. Under continuous (normal) operation, a superconducting FCC or a superconducting CC insert very little impedance in the power circuit.

A distinction exists between a fault current limiter (FCL) and an FCC. An FCL is also a variable impedance device. However, an FCL can only insert a fixed (pre-determined) impedance in the circuit under fault conditions. An FCC, on the other hand, can adjust the fault current level (i.e. magnitude) by changing the impedance to be inserted into the circuit when a fault condition is sensed. Thus, an FCC is more versatile than an FCL. An FCC not only can limit the fault current, but also can control the fault current level by adjusting the impedance to be inserted in the electrical circuit to a pre-determined amount. There is also a distinction between an FCL and a CC. An FCL is a variable impedance device under fault conditions while a CC is a variable impedance device under normal operation. A Current Controller is also more flexible and versatile than an FCL because the former can be used as an FCL under fault conditions and as a Current Controller under normal operation. One feature common to FCC, CC, and FCL systems is that all these systems insert insignificant impedance in the primary electrical circuit under operation.

A wire wound into a coil with overlapping layers (turns) insulated from one another functions as an inductive element and is commonly used in a current limiting application. Winding the coil around a material having little resistance to the flow of magnetic flux, i.e., a material which is easily magnetized, increases the inductance. Electrically conductive coils are frequently wound around a ferromagnetic core to increase inductance. Inductance can be even further increased by using a "closed loop core," which is a core forming a ring or square or similar unbroken path with no air gaps. Alternatively, if a low inductance is desired, two coils may be wound in magnetic opposition on the same closed loop core, with the magnetic field of each coil canceling the other. This procures a low impedance effect. When there is an imbalance in the currents between the two coils, the impedance increases. The capability to alter the impedance of the inductor by controlling the balance of the magnetic flux density forms the basis for use of the coil as a fault current limiter.

One approach to fault current limiting using a pair of magnetically coupled coils is disclosed in "Recovery Time of Superconducting Non-Inductive Reactor Type Fault Current Limiter," by T. Hoshino et al., Transactions on Magnetics, Volume. 32, No. 4, July 1996, which discloses the use of two superconducting coils with different crucial currents non-inductively wound on a magnetic core in magnetic opposition. Under normal operating conditions, both coils are in the superconducting state and there is little resistance across the two coils. Current is shared equally between the two coils and there is no inductive voltage drop either across the coils.

Under fault conditions one or both critical currents are exceeded to cause an imbalance in the currents in the coils and an increase in impedance for limiting the fault current. Because one of the coils must first become non-superconducting to provide the necessary resistance, restoration of normal operating conditions with removal of the fault may be delayed until the resistance in the coils decays to a low value and excessive heating may occur. Another approach to a superconducting fault current limiter is disclosed in "Tests of 100 kw High-$T_c$ Superconducting Fault Current Limiter," by W. Paul et al., IEEE Transactions on Applied Superconductivity, Volume. 5, No. 2, June 1995, which discloses an inductive superconductor fault current limiter where a superconductor shield prevents the formation of a field in the ferromagnetic core. Because this device is triggered magnetically and carries the total current load in the circuit, high currents in the circuit under normal conditions restrict the number of turns in the windings and limit performance under fault conditions. The current limiting performance of inductive fault current limiters based on Bi-2212 high temperature superconducting tubes is discussed in "Short Circuit Test Performance of Inductive High $T_c$ Superconducting Fault Current Limiters," by D. W. A. Willen et al., IEEE Transactions on Applied Superconductivity, Volume. 5, No. 2, June 1995.

A fault current limiter employing a superconductor shield core reactor (SSCR) is disclosed in my U.S. Pat. No. 5,892,644, issued Apr. 6, 1999 for "PASSIVE FAULT CURRENT LIMITING DEVICE".

SUMMARY OF THE INVENTION

The present invention is directed to a passive circuit employing a current detection or sensing device such as a superconductor shielded core reactor having a non-linear impedance such that it exhibits a low impedance under normal operating conditions and a high impedance under fault current conditions or other high current conditions above a predetermined normal value or range of values.

In one embodiment, the present invention includes a variable impedance in a secondary circuit magnetically coupled to the primary coil for inserting or "reflecting" a variable impedance in the primary circuit under fault conditions, and thus controlling the current in the power circuit.

The present invention, in another embodiment, generates a variable current in a secondary circuit, not necessarily under fault conditions, but rather under normal operating conditions, thus allowing the utility operators to limit or control the current in the primary circuit under a range of normal conditions, and producing a continuous and variable current limiting effect, not previously capable of implementation in the art because no suitable control systems were known in the art for the power and current ranges contemplated by the apparatus of the present invention.

In another embodiment, a variable impedance is included in one secondary circuit and a controlled current is presented in a second secondary circuit for combined fault current control and continuous current control (FCC/CC).

BRIEF DESCRIPTION OF THE DRAWING

FIG. 12 is an equivalent circuit diagram of the Fault Current Controller/Current Controller of FIG. 10 and FIG. 11.

DETAILED DESCRIPTION OF THE ILLUSTRATED EMBODIMENTS

Figure 1:
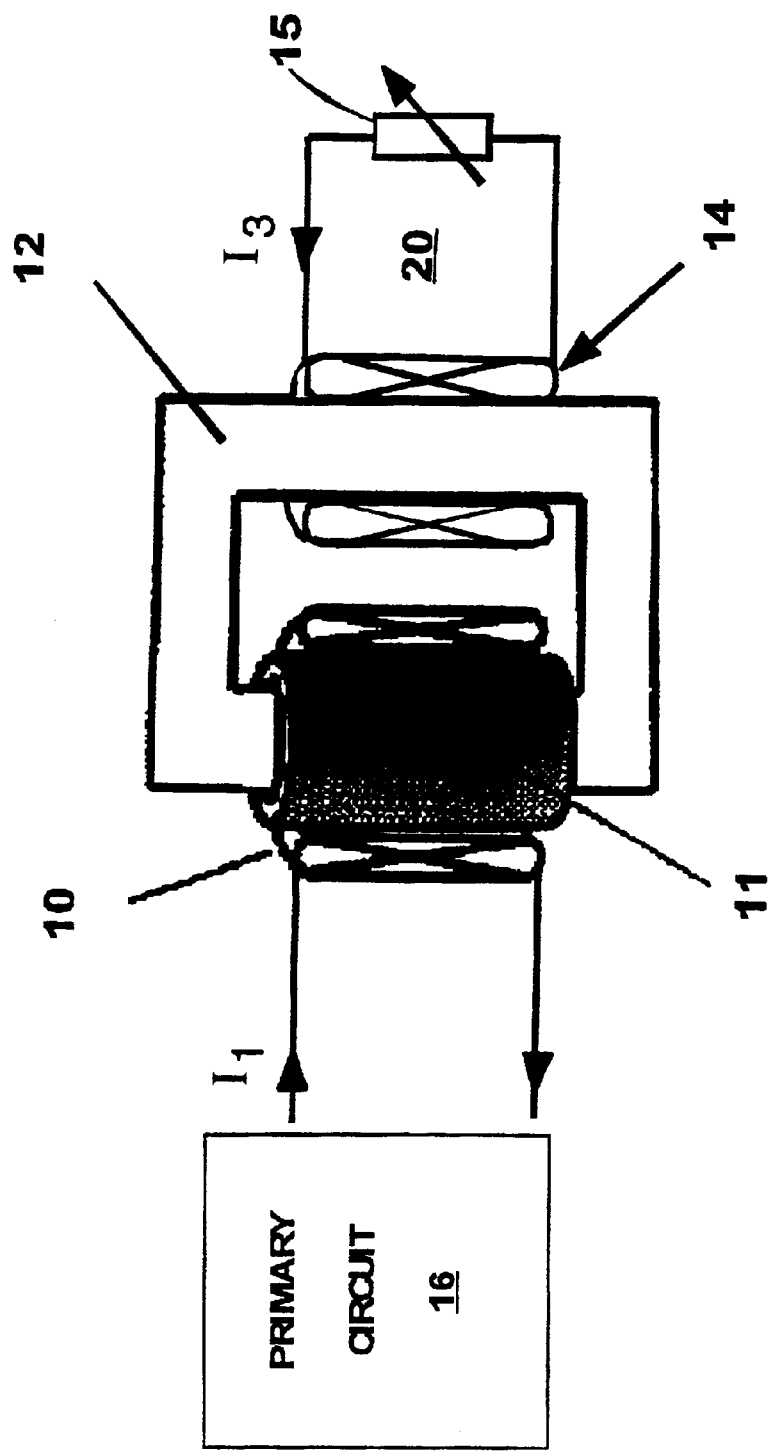
FIG. 1 is a schematic diagram of a first embodiment of a Fault Current Controller incorporating the present invention.

Turning first to FIG. 1, there is shown a schematic diagram of a Fault Current Controller according to the present invention. A primary coil 10, which may be copper, is wound on the outside of a superconductor tube diagrammatically illustrated at 11. The superconductor tube 11 is formed about a ferromagnetic core 12 which preferably forms a closed loop, but may have a gap, if desired.

The primary coil 10 is connected to a primary circuit 16, such as an electrical power distribution system, which is the primary system intended to be protected from faults (such as short circuit due to lightning, equipment failure, etc.) or overloads, or simply to have the current controlled. On another part (or leg in the case of a square or rectangular core) of the ferromagnetic core 10 is a secondary copper coil 14 which is connected in series circuit with a variable impedance Z, designated 15 in FIG. 1. Secondary coil 14 and variable impedance 15 form a secondary circuit 20.

The superconductor tube 11 is preferably operated below its critical temperature, $T_c$, either in liquid cryogens (such as liquid nitrogen) or by using cryocoolers, as are known. The primary coil 10 may be held either at room temperature or at cryogenic temperatures. The components of the secondary circuit 20 (i.e. the secondary copper coil 14 and the variable impedance 15) may be at room temperature and cooled by air, water, or other heat transfer medium.

The variable impedance 15 in FIG. 1 may be only one of, or any desired combination of, variable resistor, variable inductor, and variable capacitor, coupled either in series or in parallel circuit. For example, if it is desirable to have a purely resistive or dissipative element inserted or reflected in the primary circuit 16 under fault conditions, the variable impedance 15 will simply be a variable resistor. If a more inductive element is desired to be reflected in the primary electrical system 16, under fault conditions, then the variable impedance 15 may be a variable inductor. The value of the variable impedance can be set (adjusted) manually at the location of the device or controlled at a remote control room by an electrical controller which may be processor-based or otherwise program controlled. The primary coil 10 can be either a superconductor coil or a copper coil. It can be located either outside or inside the superconductor tube 11. An alternate design of the Fault Current Controller, shown in FIG. 2, operates on the same principle as that for the design shown in FIG. 1.

Figure 2:
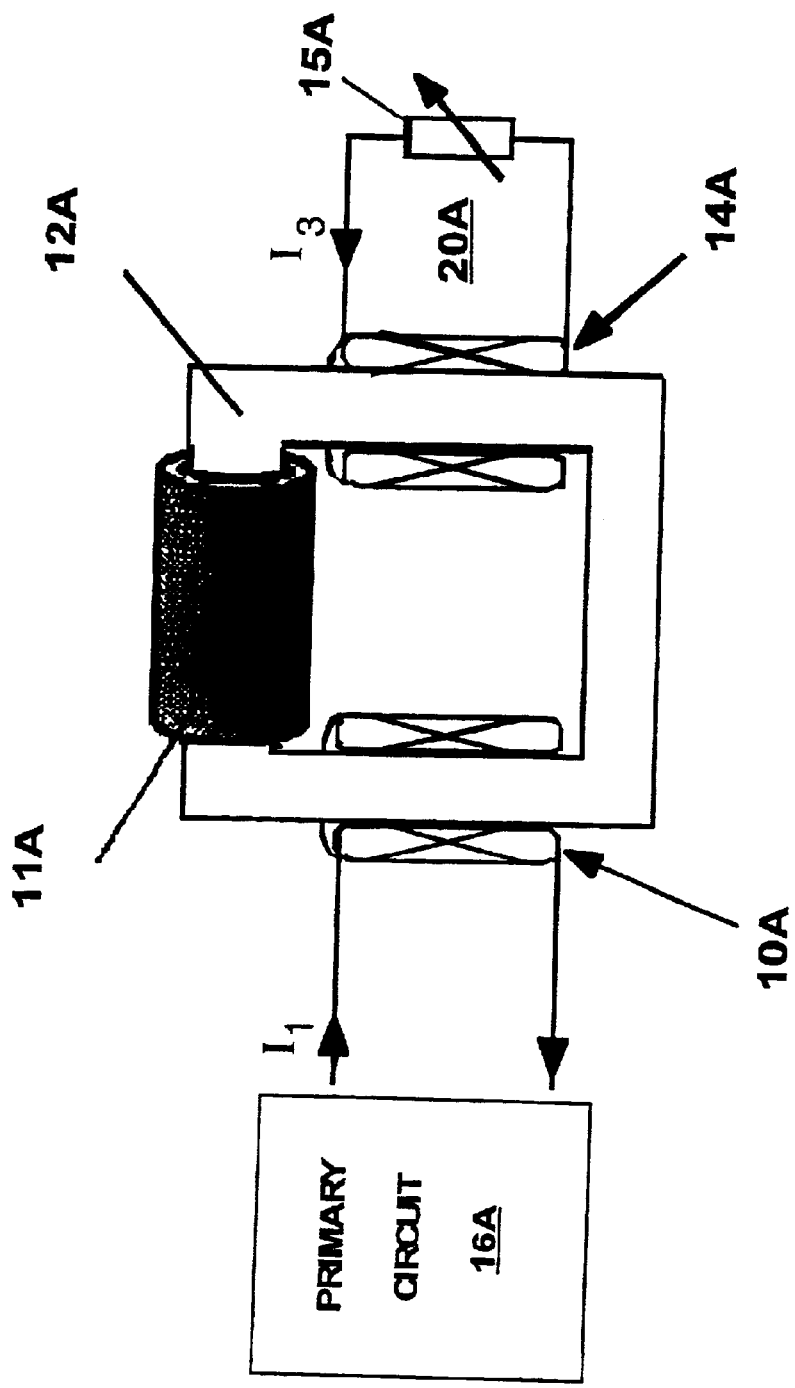
FIG. 2 is a schematic diagram of a second embodiment of a Fault Current Controller constructed according to the present invention.

Turning then to FIG. 2, elements which are shown in FIG. 2 and are identical to elements already described in connection with FIG. 1, are labeled by the corresponding number followed by an "A". Thus, the primary circuit 16A for which protection is intended is connected to a primary coil 10A which is wound around a closed ferromagnetic core 12A. A superconductor tube 11A is also wound around the core 12A, but on a different leg than the leg on which the primary coil 10A is wound. A secondary coil 14A is wound about a third leg of the core 12A (which has four sides or legs in the drawing, but may be of any number of configurations), and a variable impedance 15A is connected in series circuit with the secondary coil 14A, thus comprising a secondary circuit generally designated 20A. A superconductor as described herein can be either a cylindrical tube such as designated at 11A or a number of rings arranged in side-by-side relation to form a tube. The superconductor may also be a helically wound coil, which closes on itself to provide the shielding effect. The superconductor material may be either a low-$T_c$ or a high-$T_c$ superconductor.

Persons skilled in the art will recognize the combination of the primary coil 10, superconductor tube 11, and core 12 as a Superconducting Shield Core Reactor (SSCR). That is, the current flowing in the primary winding induces a current in the superconducting tube which carries a current which generates a flux in the core. The flux generated by the superconductor not only opposes the flux created by the primary coil, but it cancels that flux due to the almost non-existent resistance of the superconducting tube. Thus, the core is said to be shielded by the superconductor in the sense that the net flux in the core under normal design operating conditions is zero or very close to zero—i.e., negligible. But, as persons skilled in the art know, this phenomena exists only up to a certain current level, depending on the design; and thereafter, the shielding effect of the superconductor diminishes, the superconductor appears as a resistance, and this resistance of the superconductor tube is inserted or reflected into the primary circuit as an impedance.

Briefly, the Fault Current Controller (FCC) described above operates as follows: The FCC uses the shielding capability of a superconductor tube to keep the electrical impedance inserted into the primary circuit low under continuous (normal) operating conditions (steady-state AC conditions). The current of the primary circuit (16, 16A) flows through the primary coil (10, 10A) and induces a current in the superconductor which produces a corresponding flux in the core to cancel the flux generated by the primary coil for normal operating conditions. That is, the induced current in the superconductor tube (11, 11A) produces a magnetic field of sufficient intensity to cancel the magnetic field generated by the primary copper coil (10, 10A) under continuous or normal operation. Thus, the current in the primary coil (10, 10A) does not affect the ferromagnetic core (12, 12A) or the secondary coil (14, 14A).

Under these conditions, the impedance of the FCC is kept low under continuous operation of the primary electrical power system (i.e. primary circuit). Under fault conditions, a high current in the primary copper coil (10, 10A) increases the magnetic flux in the core until it exceeds the shielding capability of the superconductor tube (11, 11A), and there results a substantial increase in impedance which is reflected back to the primary circuit because the superconductor tube (11, 11A) no longer shields the iron core (12, 12A) from the resulting flux produced by the primary coil. The change in impedance in the primary circuit 16 under fault conditions depends on the properties of the superconductor tube (11, 11A), the secondary copper coil (14, 14A) and the value of the variable impedance (15, 15A) in the secondary circuit 20 (comprised of the secondary coil 14, 14A and the variable impedance (15, 15A). By adjusting the value of the variable impedance in the secondary circuit 20, the impedance inserted or reflected into the primary circuit 16 can be varied and the fault current (or the continuous current) in the primary circuit can thus be controlled to the desired level.

Equivalent Circuit of the Fault Current Controller

Figure 3:
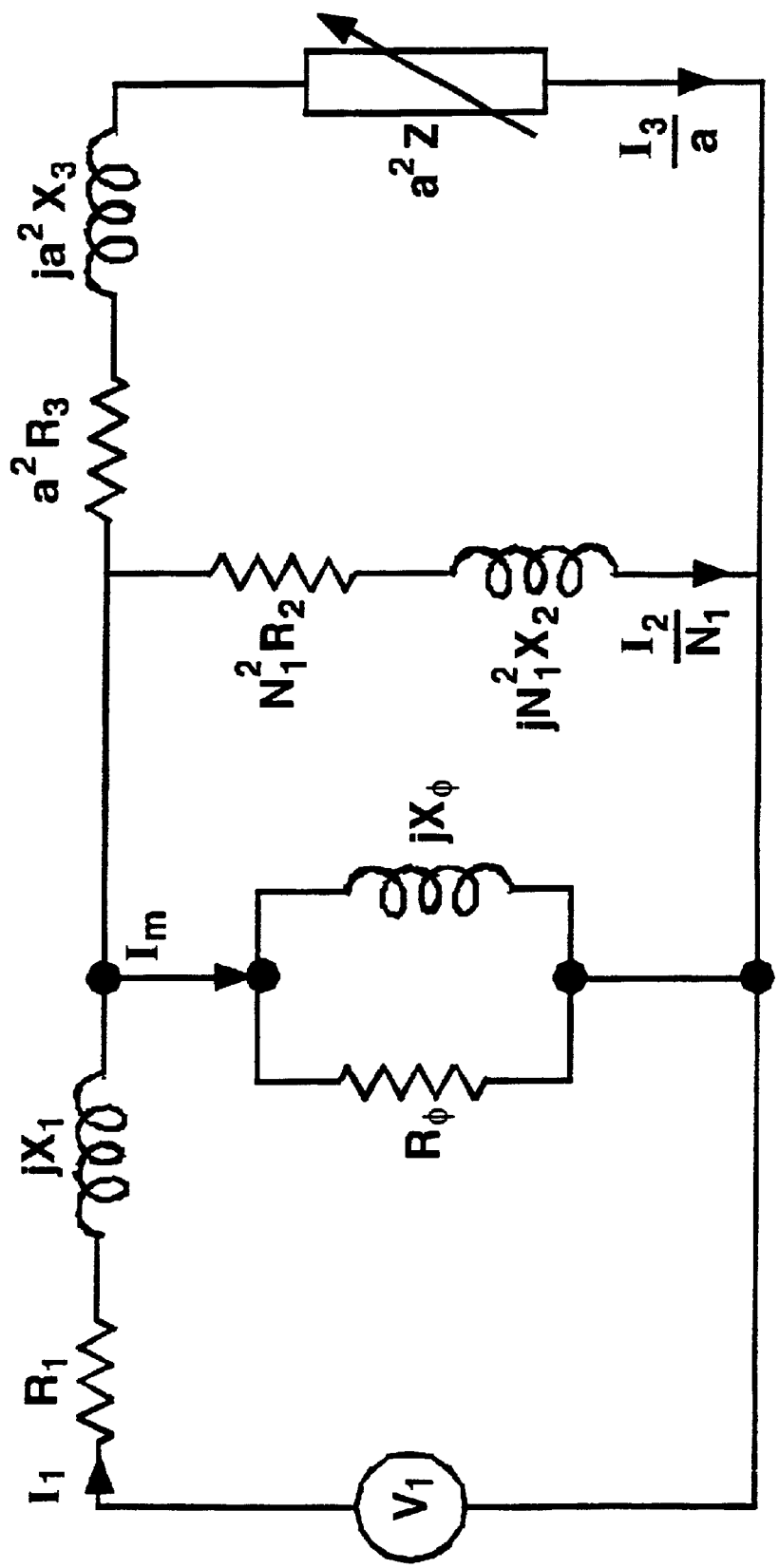
FIG. 3 is an equivalent electrical circuit diagram of the Fault Current Controller of FIGS. 1 and 2.

The equivalent circuit of the superconducting FCC described and shown in FIGS. 1 and 2 is shown in FIG. 3. The nomenclature in FIG. 3 is defined below:

$R_1$=resistance of the primary coil,
$X_1$=leakage reactance of the primary coil,
$R_f$=resistance of the ferromagnetic core,
$X_f$=reactance of the primary coil and core,
$I_m$=magnetizing current,
$R_2$=resistance of the superconductor tube,
$X_2$=reactance of the superconductor tube (one turn),
$N_1$=number of turns of the primary copper coil,
$N_2$=number of turns of the superconductor tube (=1),
$N_3$=number of turns of the secondary copper coil,
$R_3$=resistance of the secondary copper coil,
$X_3$=reactance of the secondary copper coil,
a=primary to secondary turn ratio, $N_1/N_3$,
Z=variable impedance in the secondary circuit,
$V_1$=voltage source in the primary circuit.

The source impedance is not shown in FIG. 3. The equivalent circuit of FIG. 3 is similar to that of a transformer except that there are two secondary circuits in parallel. A superconductor tube is known to act like a secondary coil with one complete turn. The secondary copper coil and the variable impedance in the secondary circuit are part of an ordinary transformer. Therefore, the proposed FCC consists of a transformer (the primary circuit) with two secondary circuits (the superconductor and the secondary circuit 20) in parallel as shown in FIG. 3.

Figure 4:
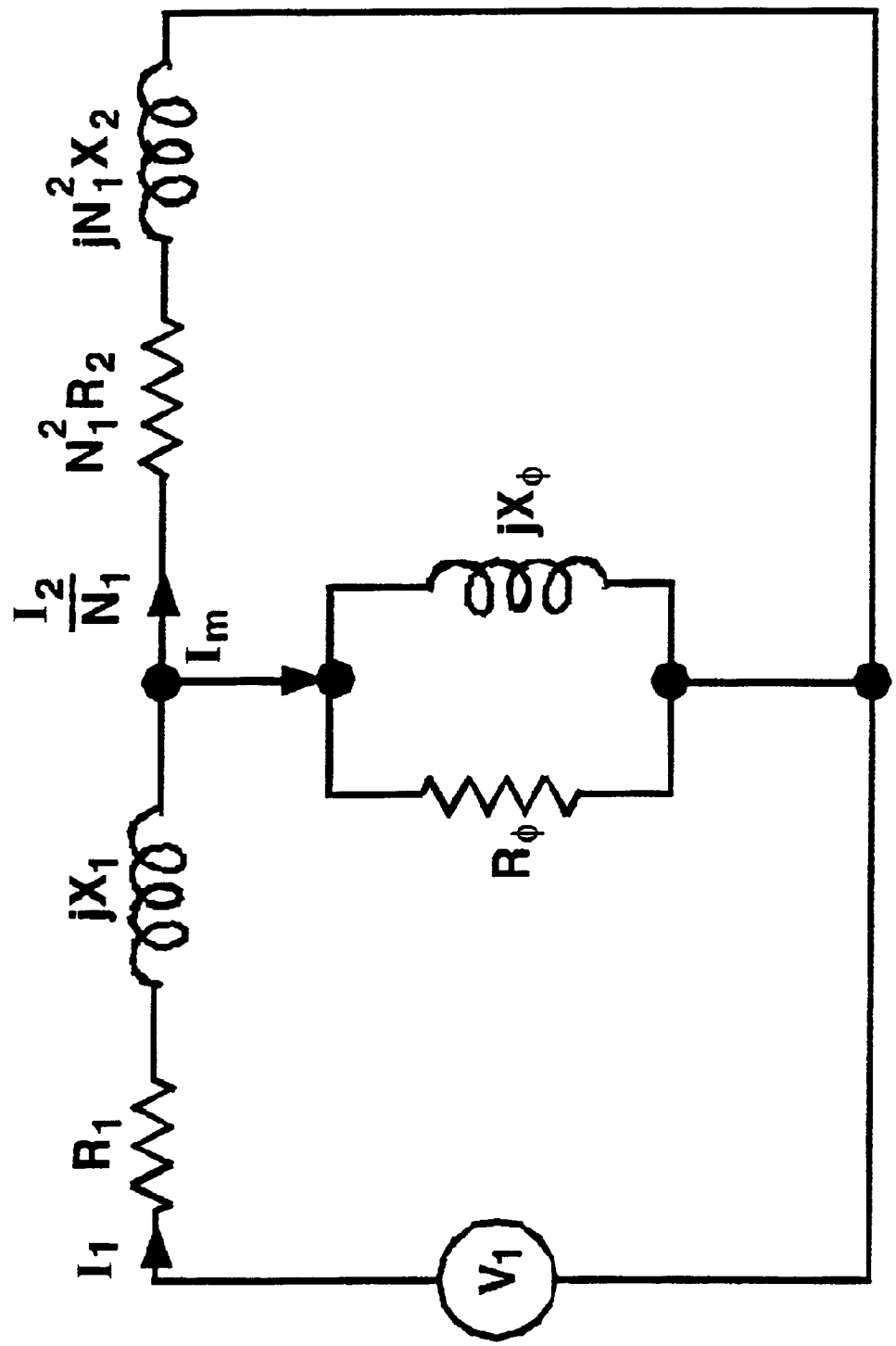
FIG. 4 is an equivalent circuit diagram of a Superconductor Shielded Core Reactor.

If the secondary circuit associated with the variable impedance (Z) is open or if the variable impedance is much larger than that of the superconductor tube under fault conditions, then the equivalent circuit reduces to that shown in FIG. 4. FIG. 4 is identical to the equivalent circuit of a Superconductor Shielded Core Reactor (SSCR), which is known to work as a superconducting Fault Current Limiter. So the SSCR is indeed a special case of the inventive FCC. The present FCC is more flexible and versatile than the FCL. As mentioned previously, the FCC can be used as an FCL and as a fault current control device. By adding the secondary circuit 20, 20A comprising (the secondary copper 14, 14A coil and the variable impedance 15, 15A) to the SSCR, the function of a SSCR is enhanced from that of an FCL to an FCC. The following describes how the present FCC operates under various conditions.

a. Continuous Operation

Under continuous operation the superconductor tube shields the ferromagnetic core from the primary copper coil because the primary current $I_1$ is relatively low. Therefore, the ferromagnetic core and the secondary copper coil are not interacting with the primary circuit. No current will be dispensed to magnetize the core ($I_m$=0) and very little current will be induced in the secondary circuit or loop associated with the variable impedance ($I_3 \cong 0$). Only the superconductor tube interacts magnetically with the primary circuit.

Figure 5:
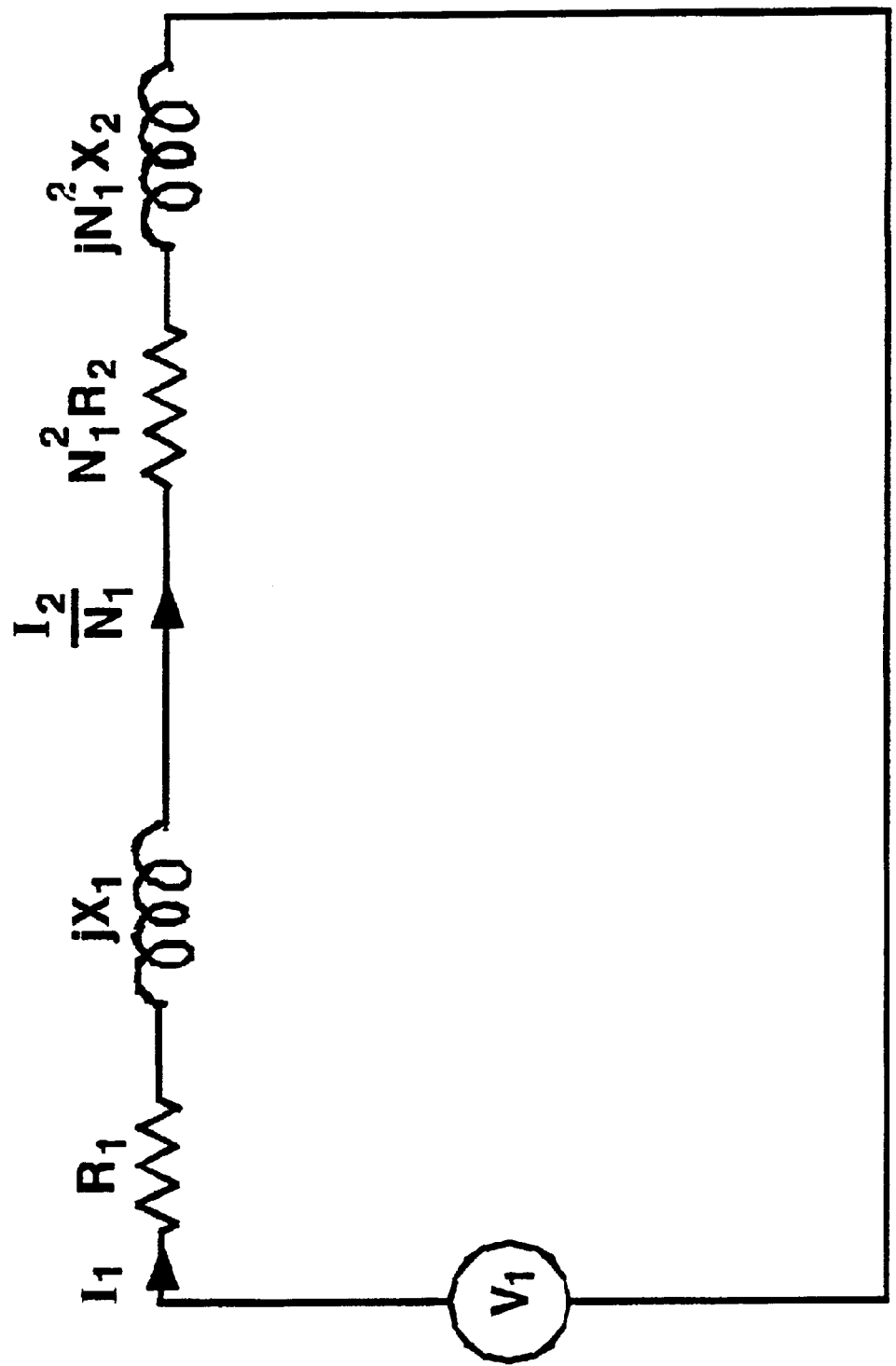
FIG. 5 is an equivalent circuit diagram of the Fault Current Controller of FIGS. 1 and 2 under normal operation.

The equivalent circuit of the FCC (FIG. 2) is reduced to the simple circuit shown in FIG. 5. In this case, the superconductor tube is in the superconducting state, so the resistance $R_2$ is extremely small. The reactance $X_2$ is also small because the superconductor tube has only one turn. In the equivalent circuit shown in FIG. 4, $R_2$ and $X_2$ are multiplied by the square of the turn number $N_1$ of the primary copper coil. The inserted impedance of $(N_1)^2 (R_2+j X_2)$ is usually much smaller than the source impedance (not shown). The resistance of the primary coil $R_1$ and the leakage inductance of the primary coil $X_1$ are also small compared to the source impedance. Thus, the total inserted impedance (due to the primary copper coil and the superconductor tube) is small compared to other impedance in the primary circuit. This is how an FCC or an FCL should work under continuous (normal) operation.

b. Fault Conditions

Under fault conditions, the current in the primary circuit ($I_1$) increases rapidly and the superconductor tube can no longer shield the ferromagnetic core from the flux generated by the primary circuit. The superconductor tube and the secondary copper coil become linked inductively to the primary coil through the ferromagnetic core. The resistance of the ferromagnetic core $R_\phi$ is very large because the core is usually made of laminated silicon steel. The reactance of the core $X_\phi$ is also very large because the permeability of the laminated steel core is several thousand. Thus, the magnetizing current $I_m$ is very small. Most of the primary current $I_1$ is dispensed in the two secondary circuits and the equivalent circuit of the FCC is reduced to that shown in FIG. 6. The impedance inserted into the primary circuit under fault conditions to limit the current is equal to the summation of the impedance of the two secondary circuits in parallel. The net impedance inserted into the primary circuit depends largely on the type of element (resistive, inductive, or capacitive) and the magnitude of the variable impedance Z.

Figure 6:
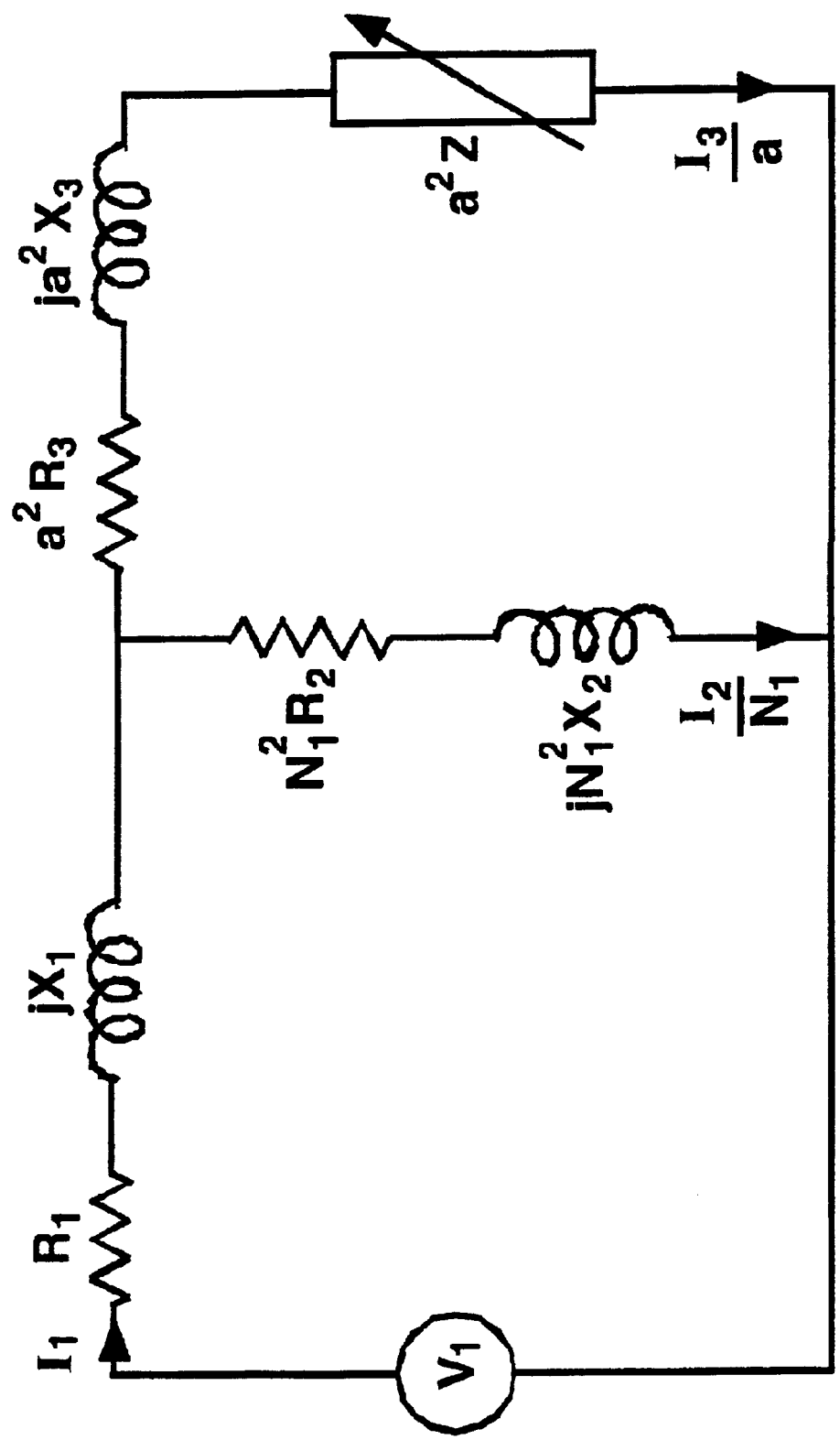
FIG. 6 is an equivalent circuit diagram of the Fault Current Controller under fault conditions.

As an example, let us analyze the simple case that the variable impedance is a purely resistive element with a variable resistance R. For simplicity, let us assume that the secondary copper coil has only one turn ($N_3$=1 and a=$N_1$). In this case, $R_3$ and $X_3$ can be neglected because they are small compared to the resistance R. Under fault conditions, the superconductor will be heating up and the resistance of the superconductor tube $R_2$ increases rapidly. The reactance of the superconductor tube $X_2$ can be neglected compared to $R_2$ because the superconductor tube has only one turn. The equivalent circuit of the superconductor tube and the secondary loop shown in FIG. 6 is reduced to two resistors ($R_2$ and R) in parallel. The net resistance $R_{net}$ seen by the primary circuit is $1/R_{net}=1/R_2+1/R$, or $R_{net}=R_2R/(R_2+R)$ If the variable resistance is much larger than the resistance of the superconductor tube ($R>>R_2$), then $R_{net} \cong R_2$. In this case, most of the current flows through the superconductor tube and the FCC behaves like an SSCR. The tube will heat up significantly and sufficient cooling must be provided to prevent the superconductor tube from overheating.

If the variable resistance is much smaller than the resistance of the superconductor tube ($R<<R_2$), then $R_{net} \cong R$. In this situation, most of the current is going through the variable resistor R. The resistor R will heat up and it must be cooled (most likely by air or water). The superconductor tube does not heat up much. Cooling the resistor R by air or water is less demanding than cooling the superconductor tube in liquid nitrogen. But then the inserted resistance ($R_{net}$) is small and the current limiting capability is reduced.

If the two resistances R and $R_2$ are comparable, then the current will be shared between the two. The heating and the limiting capability will be more moderate compared to the two extreme cases describe previously with $R>>R_2$ and $R<<R_2$. By adjusting the value of the variable resistor R, one can select the desired value of the inserted resistance $R_{net}$ from very small values all the way up to $R_2$. By doing so, the fault current can be controlled to the desired level.

It is observed that the addition of the secondary copper coil and the variable resistor to an SSCR is comparable to the addition of a stabilizer to a bare superconductor. It can be considered as a protection (from overheating) for the superconductor tube. If the superconductor heats up excessively, its resistance will increase, which automatically forces more current to the variable resistor, thus limiting the amount of heat dissipated in the superconductor tube. The concept is very simple and is similar to the use of a shunt resistor. The difference is that the desired result is accomplished magnetically because neither the superconductor tube nor the secondary copper coil is directly connected to the primary circuit or to each other. All the major components are coupled magnetically.

The above example is for a purely resistive Z. If a purely inductive or capacitive Z is employed, the net inserted impedance in the primary circuit will have a hybrid of resistive and reactive components. The variable impedance Z in the secondary circuit can be a combination of variable resistors, inductors, and capacitors in parallel or in series to achieve the desired fault current level and phase angle.

A Superconducting Current Controller

Figure 7:
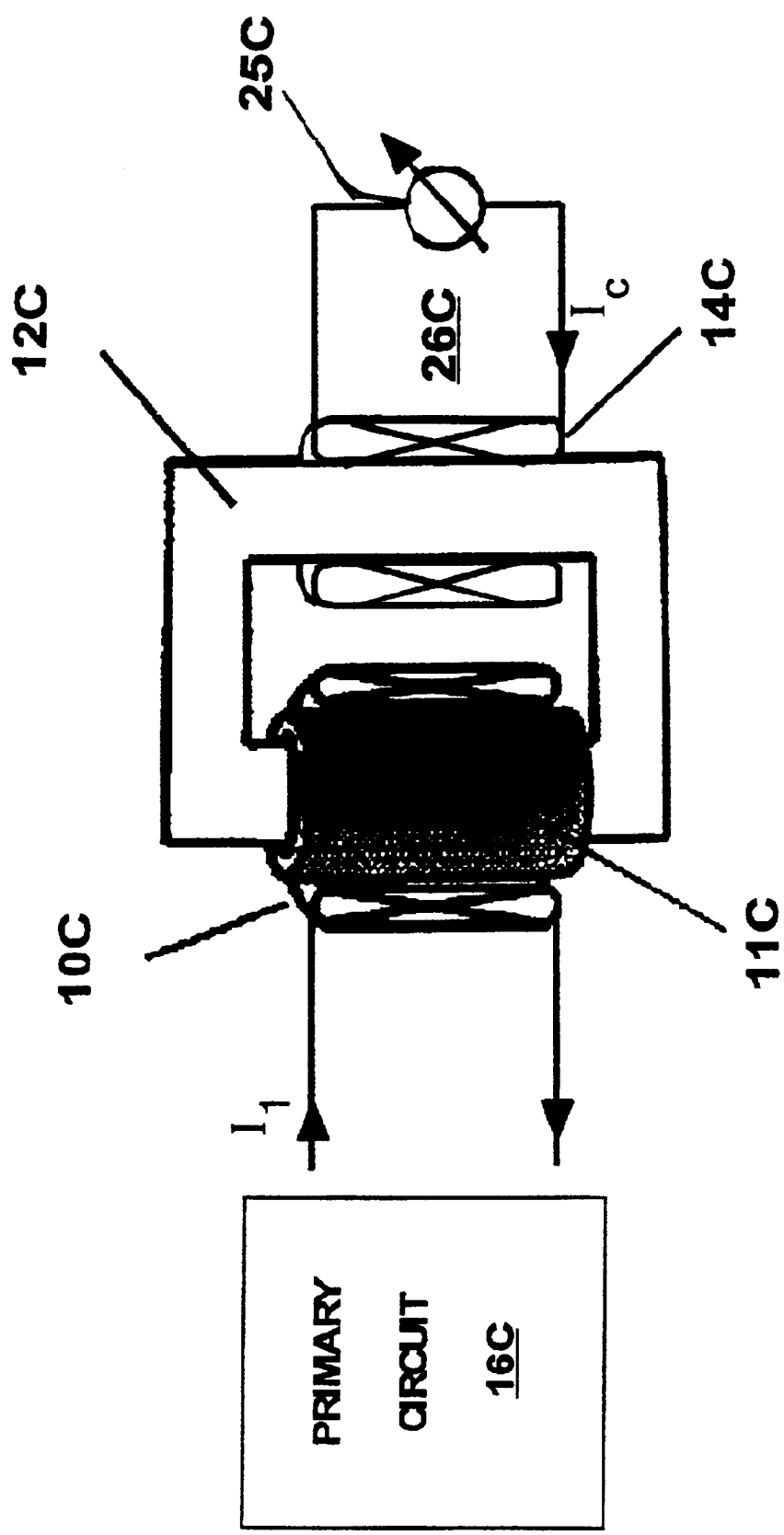
FIG. 7 is a schematic diagram of a Current Controller according to the present invention.
Figure 8:
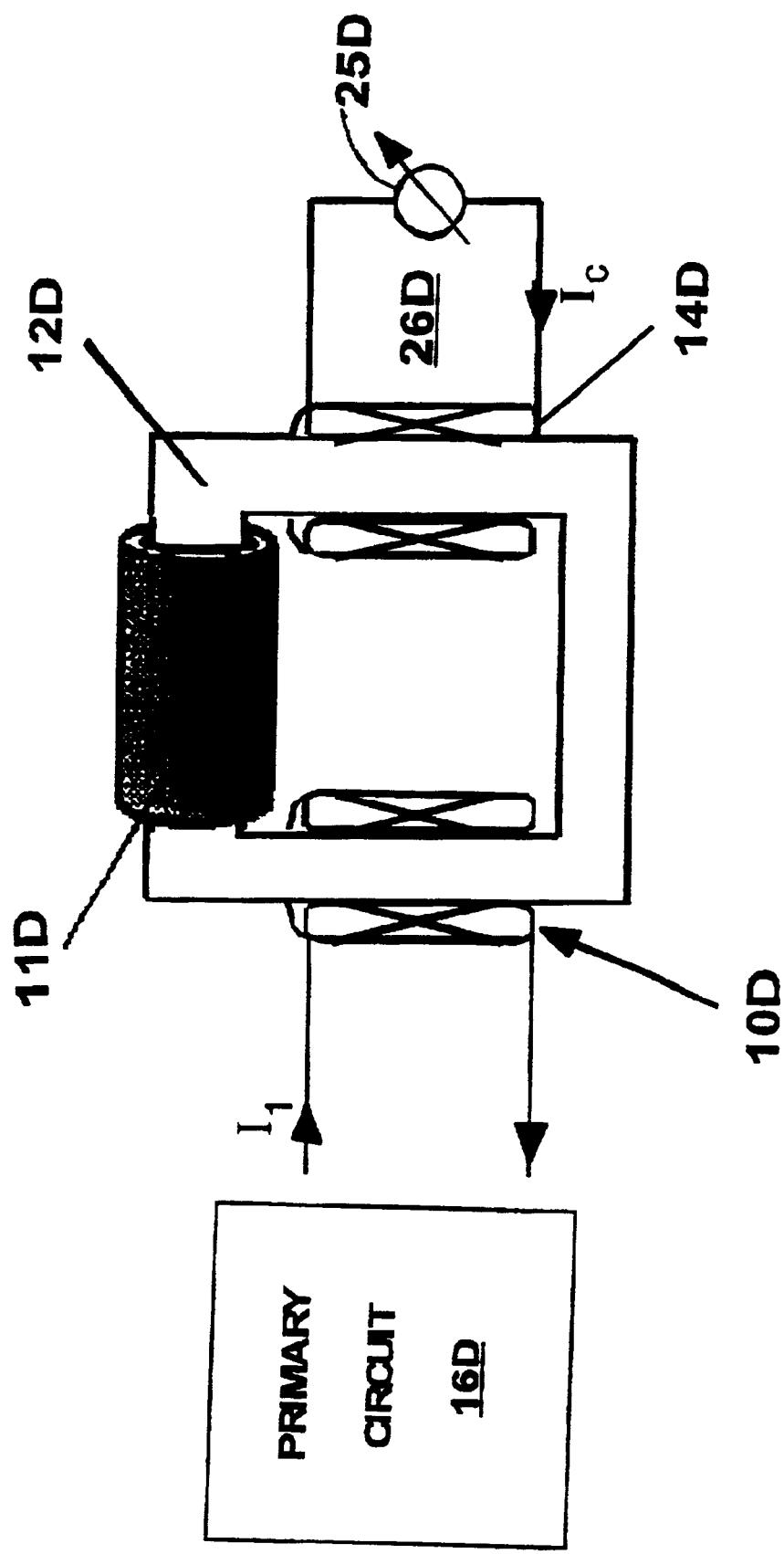
FIG. 8 is a schematic diagram of an alternate embodiment of the Current Controller of FIG. 7.
Figure 9:
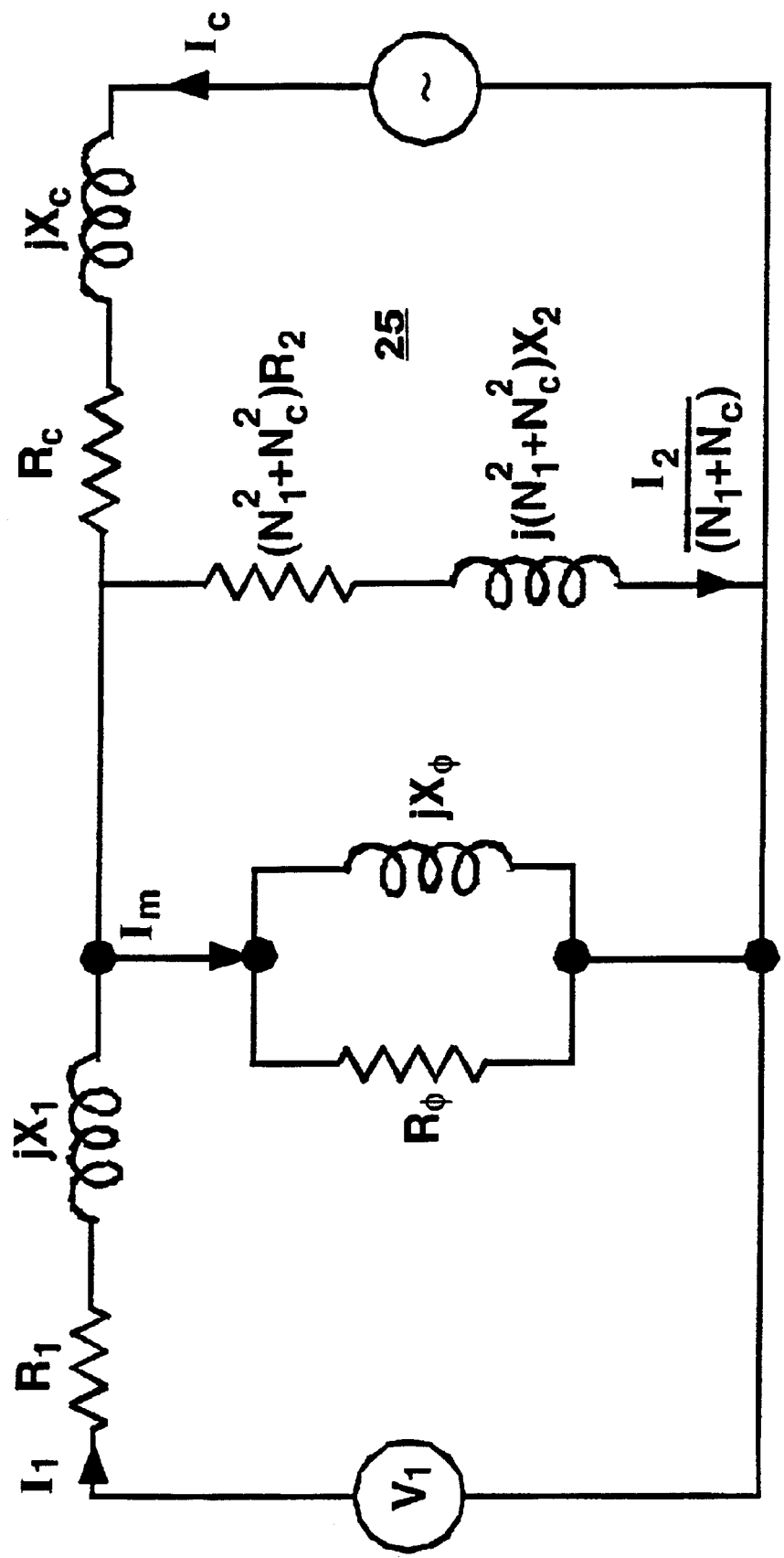
FIG. 9 is an equivalent electrical circuit diagram of the Current Controller of FIGS. 7 and 8.

The proposed superconducting CC is shown schematically in FIGS. 7 and 8. Again, elements in FIGS. 7 and 8 which are the same as those described above are identified by the same reference numerals, fold by a C (FIG. 7) and a D (FIG. 8) respectively. The Superconducting CCs in FIGS. 7 and 8 are similar to the superconducting FCC in FIGS. 1 and 2, except that a variable impedance in FIGS. 1 and 2 is replaced by a variable current source 25C, 25D in FIGS. 7 and 8 respectively. The secondary circuit in an FCC contains a passive element (i.e., a variable impedance); while that of a CC contains an active element—a variable current source. The secondary circuit of a CC (comprising a secondary or control coil and a variable current source) in FIGS. 7 and 8 as may be referred to as a control circuit 26C and 26D respectively. The equivalent circuit of the proposed CC is shown in FIG. 9, where $I_c$ is the control current, $N_c$ is the number of turns of the control coil, $R_c$ is the resistance of the control circuit, and $X_c$ is the reactance of the control circuit.

Under continuous (normal) operation, the control circuit (26C, 26D) is either open or the control current $I_c$ is zero ($N_c$ is zero also). There is very little impedance inserted in the primary circuit because the superconductor tube shields the ferromagnetic core from the primary current $I_1$. Under fault conditions, the current in the primary circuit (and the magnetic field generated by the primary current) exceeds the shielding capability of the superconductor tube, the ferromagnetic core becomes a part of the primary circuit. An impedance is inserted into the primary circuit to limit the fault current. Therefore, with the control circuit inactive, the CC behaves just like a SSCR, which is one particular type of an FCL. The equivalent circuit of FIG. 9 reduces to that shown in FIG. 4 for an SSCR.

If it is desired to control the current in the primary circuit (not necessarily a fault condition), the control circuit must be activated. By adjusting the current level $I_c$ in the control circuit, the impedance inserted into the primary circuit can be varied. In order for this system to work well, the magnetic field generated by the control coil must be in the same direction as that generated by the primary copper coil. In other words, the magnetic field generated by the primary current and the control current must be in phase, so the net magnetic field in the ferromagnetic core is the summation of the two. The two copper coils with current flowing simultaneously is equivalent to an increase in current in the primary coil, which can facilitate the penetration of the superconductor tube by the applied magnetic field, even though the magnetic field generated by the current in the primary coil alone is not sufficient to penetrate the superconductor tube. The inserted impedance is primarily resistive because the proposed CC behaves like a closed-core SSCR, which is known to be a resistive device. In summary, the proposed superconducting CC is more flexible and versatile than an FCL. A CC can be used as an FCL under fault conditions and it can also be used to control current level by inserting an impedance into the primary circuit under continuous (normal) operation.

The variable current sources (25C, 25D) in FIGS. 7 and 8 of the present CC can be either DC or AC. The variable current source can be a variable voltage source (a variac) in series with a variable impedance to provide an AC source. It can be a battery (or battery bank) in series with a variable impedance to provide a DC source. As mentioned previously, the current $I_c$ must produce a magnetic field in the same direction (DC) as or in phase (AC) with that generated by the primary current $I_1$. The superconductor tube must be operated below its critical temperature either in liquid cryogens (such as liquid nitrogen) or by using cryocoolers. The primary coil may be either at room temperature or at cryogenic temperatures. The control circuit (the copper coil and the variable current source) may be at room temperature and cooled by either air or water. The primary coil can be either a superconductor coil or a copper coil. It can be located either outside or inside the superconductor tube, or located as shown in FIG. 8, which operates on the same principle as that for the design shown in FIG. 7. The superconductor may either be a cylindrical tube or a number of rings arranged to form a tube. The superconductor may also be a coil, which closes on itself to provide the shielding effect. The superconductor can be either a low-$T_c$ or a high-$T_c$ superconductor. An alternative location of the control coil (14C, 14D) is on the outside of the primary coil and concentric with the primary coil so that the magnetic fluxes are additive.

A Superconducting Fault Current Controller/Current Controller

Figure 10:
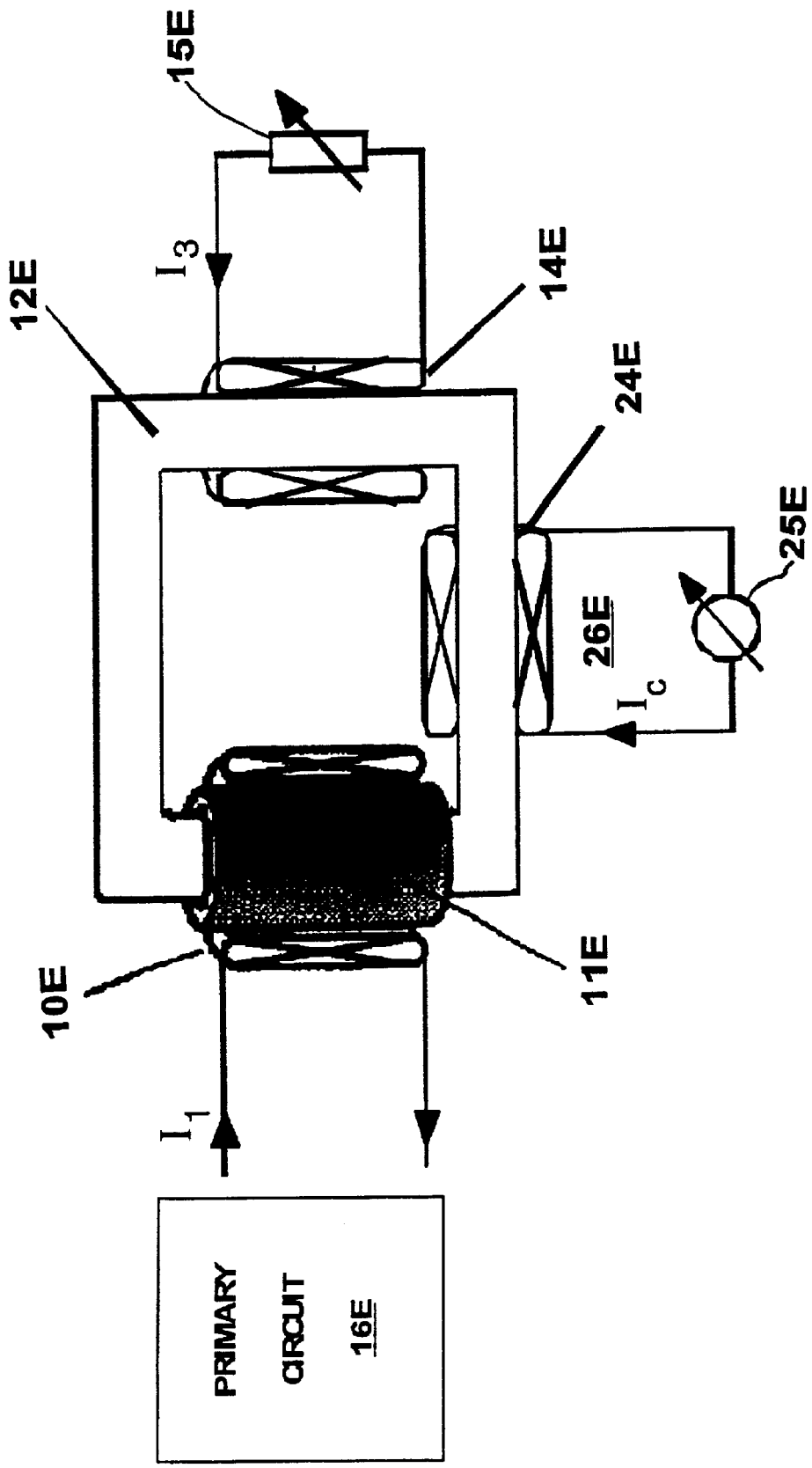
FIG. 10 is a schematic circuit diagram of a combined Fault Current Controller/Current Controller.
Figure 11:
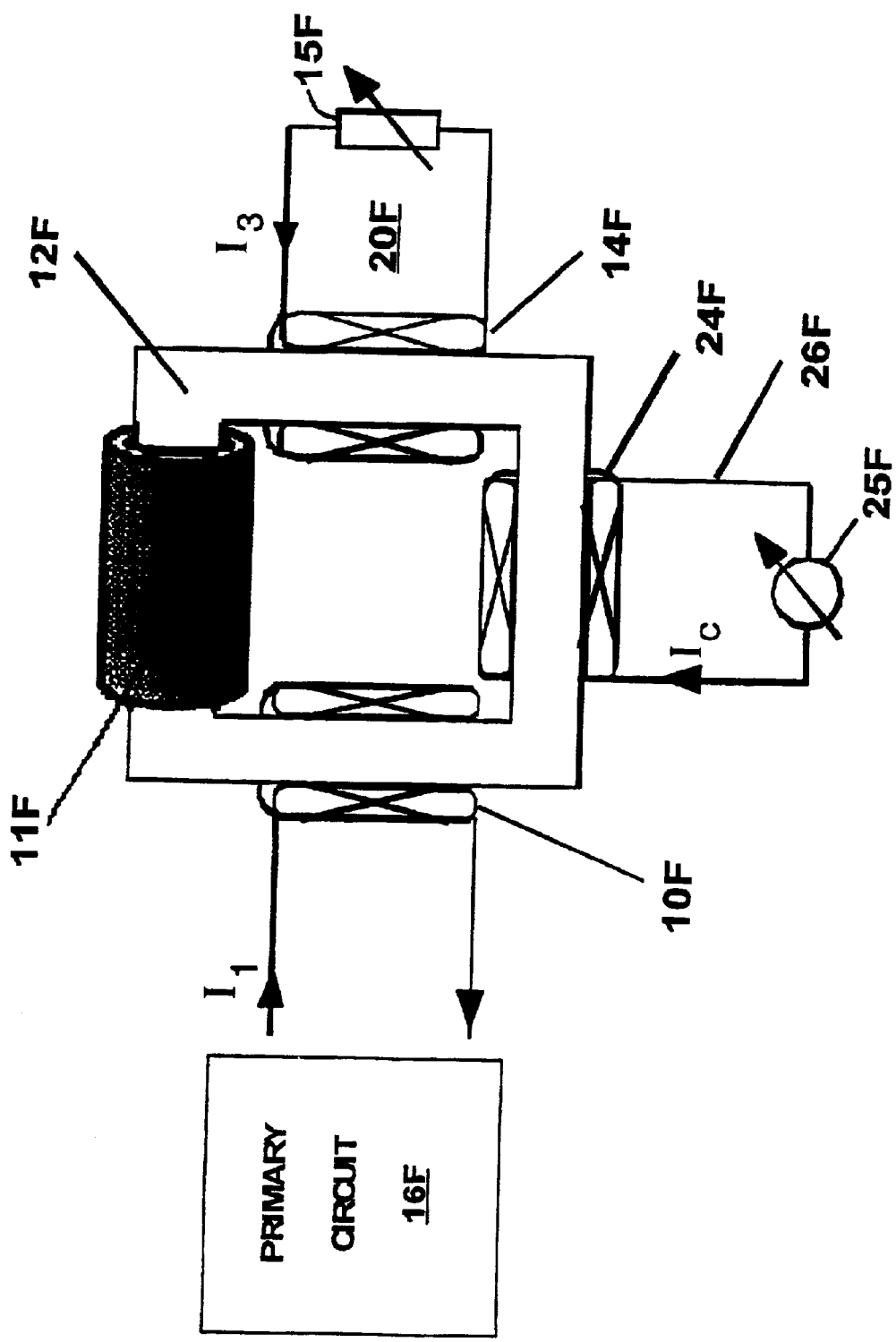
FIG. 11 is a schematic circuit diagram of an alternate embodiment of the Fault Current Controller/Current Controller of FIG. 10.

FIG. 10 is a schematic diagram of a superconducting FCC/CC employing the components of FIGS. 1 and 7. Similar components are designated with the same number fold by and "E". FIG. 11 is a schematic of a superconductor FCC/CC employing the components of FIGS. 2 and 8. Similar components are designated with the same number fold by and "F". FIG. 11 shows a superconducting FCC/CC employing similar components to FIG. 10, but the superconducting tube 1 E is placed about a separate leg of the ferromagnetic core 12F, as in FIGS. 2 and 8.

The equivalent circuit of the proposed FCC/CC is shown in FIG. 12. The combined FCC/CC is more flexible and versatile than either an FCC or a CC. A superconducting FCC/CC can control the current level in the primary circuit under continuous (normal) operation and under fault conditions. The FCC/CC inserts very little impedance into the primary circuit under continuous operation when it is not operating in the current control mode.

When the control circuit is open or inactive ($I_c=0$ and $N_c=0$), the equivalent circuit of FIG. 12 reduces to that shown in FIG. 3, and therefore the FCC/CC behaves like an FCC. When the secondary circuit is open ($I_3=0$), the equivalent circuit of FIG. 12 reduces to that shown in FIG. 9, and the FCC/CC behaves like a CC. Whatever the FCC and the CC can do, the FCC/CC can do it too. Furthermore, as described previously, a superconducting CC inserts a mostly resistive element into the primary circuit under continuous operation. The FCC/CC, however, has the additional flexibility of inserting a more reactive (or a hybrid of resistive/reactive) element into the primary circuit because of the variable impedance in the FCC/CC. By proper selection of various components (the superconductor tube, the variable impedance in the secondary circuit, the three copper coils, the current source in the control circuit, etc.) in the proposed FCC/CC, current control under continuous operation, and current limitation and control under fault conditions can be achieved for most applications in electrical distribution and transmission systems (i.e., the primary circuit).

The superconductor tube must be operated below its critical temperature either in liquid cryogens (such as liquid nitrogen) or by using cryocoolers. The primary coil can be either at room temperature or at cryogenic temperatures. The secondary circuit (the copper coil and the variable impedance) can be at room temperature and cooled by either air or water. The variable impedance 15E in FIG. 10 can be a combination of variable resistor, inductor, and capacitor, either in series or in parallel. For example, if it is desirable to have a purely resistive element inserted in the primary circuit under continuous operation or under fault conditions, the variable impedance will simply be a variable resistor. If it is favorable to insert a more reactive element into the primary circuit, then the variable impedance will simply be a variable inductor. The value of the variable impedance can be set (adjusted) manually at the location of the device or remotely at a central control room.

The primary coil can be either a superconductor coil or a copper coil. It can be located either outside or inside the superconductor tube in FIG. 10, or it can be located in an alternate design as shown in FIG. 11. The superconductor can either be a cylindrical tube or a number of rings stacked up to form a tube. The superconductor can also be a coil, which closes on itself to provide the shielding effect. The superconductor can be either a low-$T_c$ or a high-$T_c$ superconductor. The variable current source in FIGS. 10 and 11 of the proposed FCC/CC can be either DC or AC. The variable current source can be a variable voltage source (a variac) in series with a variable impedance to provide an AC source. It can be a battery (or battery bank) in series with a variable impedance to provide a DC source. The value of the variable current source in the control circuit can be set (adjusted) manually at the location of the device or remotely at a central control room.

Having thus disclosed various embodiments of the invention, persons skilled in the art will appreciate that equivalent elements may be substituted for those disclosed and modifications made while continuing to practice the principles of the invention. It is therefore intended that all such modifications and substitutions be covered as they are embraced within the spirit and scope of the appended claims.

The embodiments of the invention in which an exclusive property or privilege is claimed are defined as follows:

1. A superconducting Current Controller for controlling the current in a primary circuit, the combination comprising:
   a primary coil coupled to said primary circuit and carrying a first current for generating a first magnetic flux;
   a superconducting tube magnetically coupled to said primary coil and carrying a second current induced by said first current, said second current producing a magnetic flux opposing said first magnetic flux to substantially cancel said first magnetic flux when said first current is within a pre-determined range;
   a secondary coil magnetically coupled to said primary coil and said superconducting tube;
   a control circuit comprising a control coil magnetically coupled to said primary coil and wound to generate a magnetic field adding to the magnetic field of said primary coil;
   and a variable current source connected in circuit with said control coil, whereby the value of current generated by said variable current source reflects an impedance in said primary circuit to control the current therein,
   a variable impedance coupled in circuit with said secondary coil,
   whereby when said first current increases beyond a pre-determined range, said second magnetic flux does not completely cancel said first magnetic flux, thereby inducing a current in said secondary coil and, said variable impedance is reflected into said primary circuit to control the current therein.

2. The apparatus of claim 1 wherein an increase in said first current is a fault current and wherein the value of said variable impedance is such as to limit said fault current in said primary circuit.

3. The apparatus of claim 2 further including a ferromagnetic core, said primary coil and said secondary coil being wound about said ferromagnetic core and said superconducting tube extending about said ferromagnetic core.

4. The apparatus of claim 3 characterized in that said ferromagnetic core forms a closed loop.

5. The apparatus of claim 3 wherein said primary coil extends about the exterior of said superconducting tube.

6. The apparatus of claim 3 wherein said superconducting tube consists of a single coil.

7. The apparatus of claim 3 wherein said superconducting tube comprises a plurality of rings arranged in side-by-side relationship to form a tube.

8. The apparatus of claim 3 wherein said core has at least first, second and third sections, said primary coil being formed about said first section, said secondary coil being formed about said second section, and said superconducting tube being formed about said third section of said core.

9. A superconducting Current Controller for controlling the current in a primary circuit, the combination comprising:
- a primary coil coupled to said primary circuit and carrying a first current for generating a first magnetic flux;
- a control coil magnetically coupled to said primary coil;
- a variable current source in circuit with said control coil, to generate a second current in said control coil such that said control coil generates a second magnetic flux in a direction additive to said first magnetic flux;
- a superconducting tube magnetically coupled to said primary coil and said control coil and carrying a third current induced by said first current, said third current producing a third magnetic flux opposing said first and second magnetic fluxes to substantially cancel said first and second magnetic fluxes when said first current is within a pre-determined range;
- whereby when said second current increases beyond a pre-determined value, said third magnetic flux does not completely cancel said first and second magnetic fluxes, and an impedance having a value determined by the magnitude of said second current is reflected into said primary circuit to control the current therein.

10. The apparatus of claim 9 wherein an increase in said first current to a fault current exceeds the ability of said superconductor to cancel said first and second fluxes and an impedance sufficient to limit said fault current is inserted in said primary circuit.

11. The apparatus of claim 10 further including a ferromagnetic core, said primary coil and said control coil being wound about said ferromagnetic core and said superconducting tube extending about said ferromagnetic core.

12. The apparatus of claim 11 characterized in that said ferromagnetic core forms a closed loop.

13. The apparatus of claim 11 wherein said primary coil extends about the exterior of said superconducting tube.

14. The apparatus of claim 11 wherein said superconducting tube consists of a single coil.

15. The apparatus of claim 11 wherein said superconducting tube comprises a plurality of rings arranged in side-by-side relationship to form a tube.

16. The apparatus of claim 11 wherein said core has at least first, second and third sections,
   said primary coil being formed about said first section,
   said control coil being formed about said second section,
   and said superconducting tube being formed about said third section of said core.

17. A superconducting Current Controller for controlling the current in a primary circuit, the combination comprising:
- a primary coil coupled to said primary circuit and carrying a first current for generating a first magnetic flux;
- a superconducting tube magnetically coupled to said primary coil and carrying a second current induced by said first current, said second current producing a magnetic flux opposing said first magnetic flux to substantially cancel said first magnetic flux when said first current is within a pre-determined range;
- a secondary coil magnetically coupled to said primary coil and said primary coil and said superconducting tube;
- a variable impedance coupled in circuit with said secondary coil,
- whereby when said first current increases beyond a pre-determined range, said second magnetic flux does not completely cancel said first magnetic flux, thereby inducing a current in said secondary coil and, said variable impedance is reflected into said primary circuit to control the current therein;
- a control coil magnetically coupled to said primary coil and said superconductor tube; and
- a variable current source in circuit with said control coil to generate a third current in said control coil such that said control coil generates a second magnetic flux in a direction additive to said first magnetic flux such that when said first and second fluxes exceed the ability of said superconductor to cancel said first and second fluxes, said superconductor inserts impedance in said primary circuit.

18. The apparatus of claim 17, wherein an increase in said first current is a fault current and wherein the value of said variable impedance is such as to limit said fault current in said primary circuit.

19. The apparatus of claim 18, and further including a ferromagnetic core, said primary coil, said secondary coil and said control coil being wound about said ferromagnetic core and said superconducting tube extending about said ferromagnetic core.

20. The apparatus of claim 19 characterized in that said ferromagnetic core forms a closed loop.

21. The apparatus of claim 19, wherein said primary coil extends about the exterior of said superconducting tube.

22. The apparatus of claim 19, wherein said superconducting tube consists of a single coil.

23. The apparatus of claim 19, wherein said superconducting tube comprises a plurality of rings arranged in side-by-side relationship to form a tube.

* * * * *